United States Patent
Sarangdhar et al.

(10) Patent No.: US 9,935,773 B2
(45) Date of Patent: *Apr. 3, 2018

(54) TRUSTED PLATFORM MODULE CERTIFICATION AND ATTESTATION UTILIZING AN ANONYMOUS KEY SYSTEM

(71) Applicant: Intel Corporation, Santa Clara, CA (US)

(72) Inventors: Nitin V. Sarangdhar, Portland, OR (US); Daniel Nemiroff, El Dorado Hills, CA (US); Ned M. Smith, Beaverton, OR (US); Ernie Brickell, Hillsboro, OR (US); Jiangtao Li, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/431,479

(22) Filed: Feb. 13, 2017

(65) Prior Publication Data
US 2017/0170966 A1    Jun. 15, 2017

Related U.S. Application Data

(63) Continuation of application No. 14/542,491, filed on Nov. 14, 2014, now Pat. No. 9,608,825.

(51) Int. Cl.
*H04L 9/32* (2006.01)
*H04L 9/08* (2006.01)
*H04L 9/14* (2006.01)

(52) U.S. Cl.
CPC .......... *H04L 9/3234* (2013.01); *H04L 9/0861* (2013.01); *H04L 9/0866* (2013.01);
(Continued)

(58) Field of Classification Search
USPC ........................................................ 713/156
See application file for complete search history.

(56) References Cited

U.S. PATENT DOCUMENTS

2004/0205341 A1* 10/2004 Brickell ................ G06F 21/445
                                                           713/168
2006/0129824 A1*  6/2006 Hoff ...................... H04L 9/3234
                                                           713/176

(Continued)

OTHER PUBLICATIONS

International Search Report and Written Opinion issued in corresponding PCT application No. PCT/US2015/055508, dated Jan. 29, 2016, 14 pages.

(Continued)

*Primary Examiner* — Jason Lee
(74) *Attorney, Agent, or Firm* — Grossman Tucker Perreault & Pfleger, PLLC

(57) ABSTRACT

This application is directed to trusted platform module certification and attestation utilizing an anonymous key system. In general, TPM certification and TPM attestation may be supported in a device utilizing integrated TPM through the use of anonymous key system (AKS) certification. An example device may comprise at least combined AKS and TPM resources that load AKS and TPM firmware (FW) into a runtime environment that may further include at least an operating system (OS) encryption module, an AKS service module and a TPM Certification and Attestation (CA) module. For TPM certification, the CA module may interact with the other modules in the runtime environment to generate a TPM certificate, signed by an AKS certificate, that may be transmitted to a certification platform for validation. For TPM attestation, the CA module may cause TPM credentials to be provided to the attestation platform for validation along with the TPM and/or AKS certificates.

19 Claims, 9 Drawing Sheets

(52) U.S. Cl.
CPC .............. *H04L 9/14* (2013.01); *H04L 9/3263* (2013.01); *H04L 2209/127* (2013.01)

(56) References Cited

U.S. PATENT DOCUMENTS

| | | |
|---|---|---|
| 2007/0101138 A1* | 5/2007 | Camenisch ........... H04L 9/3234 713/168 |
| 2009/0271618 A1 | 10/2009 | Camenisch et al. |
| 2009/0307487 A1 | 12/2009 | Movva et al. |
| 2010/0088499 A1* | 4/2010 | Zimmer .................. G06F 21/10 713/2 |
| 2011/0202992 A1 | 8/2011 | Xiao et al. |
| 2014/0006776 A1 | 1/2014 | Scott-Nash et al. |
| 2014/0089660 A1 | 3/2014 | Sarangshar et al. |
| 2014/0317413 A1 | 10/2014 | Deutsch et al. |

OTHER PUBLICATIONS

Notice of Allowance issued in U.S. Appl. No. 14/542,491, dated Nov. 18, 2016, 22 pages.
Office Action issued in U.S. Appl. No. 14/542,491, dated Jun. 8, 2016, 15 pages.
International Preliminary Report on Patentability and Written Opinion issued in PCT Application No. PCT/US2015/055508, dated May 16, 2017, 10 pages.

* cited by examiner

TRUSTED PLATFORM MODULE CERTIFICATION AND ATTESTATION UTILIZING AN ANONYMOUS KEY SYSTEM

CROSS-REFERENCE TO RELATED APPLICATION

The present application is a continuation of U.S. patent application Ser. No. 14/542,491 filed Nov. 14, 2014, the entire disclosure of which is incorporated herein by reference.

TECHNICAL FIELD

The present disclosure relates to system security, and more particularly, to a system that supports trusted platform module certification and attestation using an anonymous key system.

BACKGROUND

Safeguarding electronic information has become an important issue based on the growing variety of transactions that may now be conducted electronically. Various threats including, for example, hackers, malicious software (e.g., malware) such as viruses, rootkits, etc. may share at least one purpose: to circumvent existing protection measures to gain access to, or control over, another users' device. Users employing a device to perform daily transactions may be unaware that their device has been compromised, and may be unknowingly providing sensitive personal, financial and/or proprietary data to a third party. Technology is continually being developed to combat these types of attacks. However, as new virus protections strategies emerge, hackers are finding ways to attack at lower levels within a device, gaining access and/or control at a level in the device having higher priority that the protection software. As a result, device manufacturers are building security measures into the actual hardware of a device. For example, these security features may be enabled an early stage of device initialization, and may ensure that programs loaded later are safe by performing a security check as the programs are loaded into the device.

At least one example of a hardware-based security system is Trusted Platform Module (TPM). TPM is an international standard for a secure cryptoprocessor, which may be a discrete microprocessor dedicated to securing hardware by integrating cryptographic keys into a device. TPM's technical specification is maintained by a computer industry consortium called Trusted Computing Group (TCG). Consistent with the 2.0 version of the TPM standard, a manufacturer-provisioned endorsement key (EK) and EK certificate are required for attestation identification key (AIK) generation. Discrete TPM solutions typically comprise on-chip storage that may be able to accommodate the EK and EK certificate. However, new integrated solutions are being contemplated that do not have space available for the EK and EK certificate. Consistent with this requirement, devices using integrated TPM may require a serial peripheral interface (SPI) Flash specifically for the EK and EK certificate, which may need to be provisioned to the SPI Flash following assembly by the original equipment manufacturer (OEM). This change to the manufacturing process may result in substantial cost increases for devices using integrated TPM.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
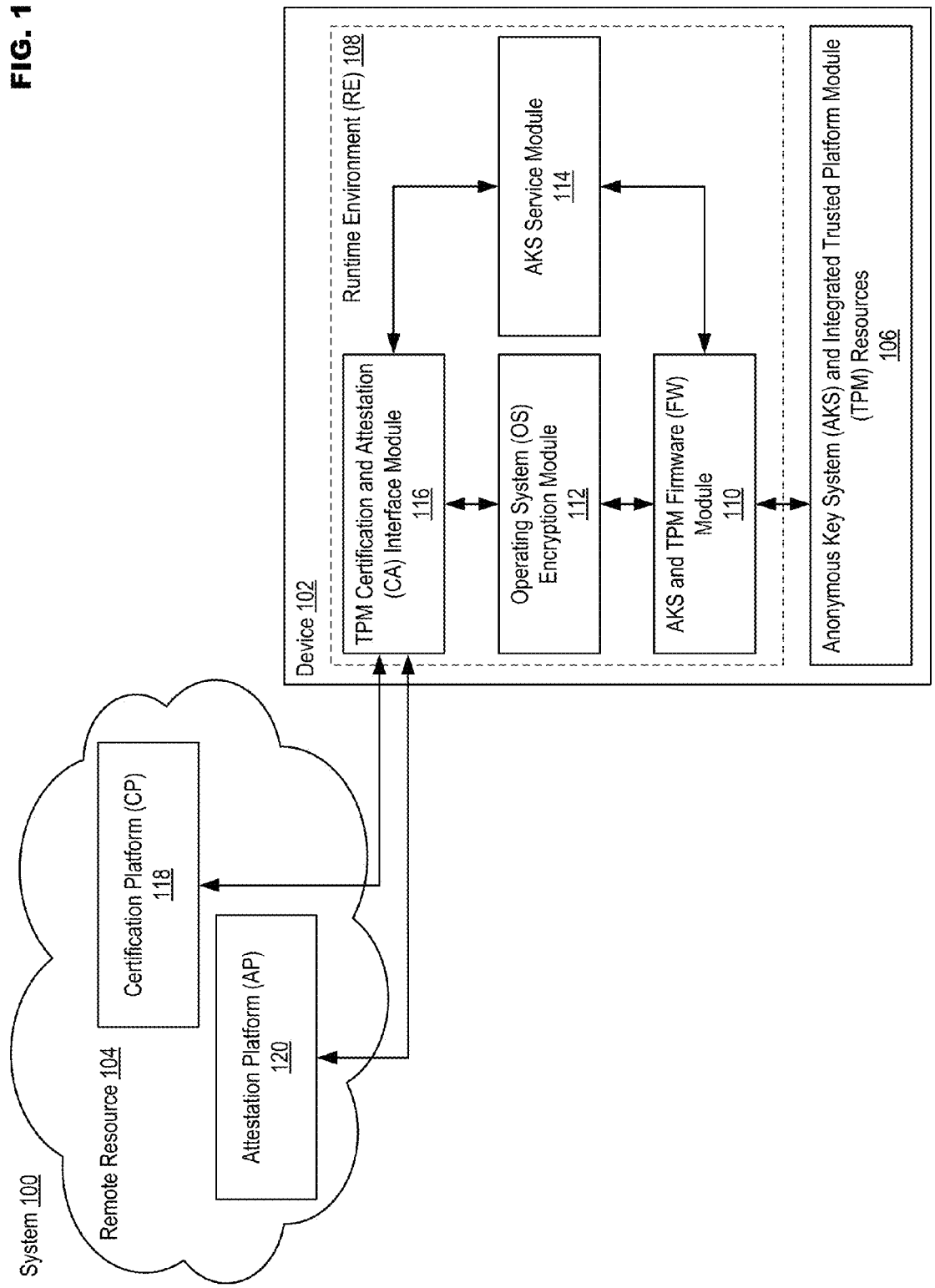
FIG. 1 illustrates an example system for TPM certification and attestation utilizing an anonymous key system in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

The present disclosure is directed to trusted platform module certification and attestation utilizing an anonymous key system. In general, TPM certification and TPM attestation may be supported in a device utilizing integrated TPM through the use of anonymous key system (AKS) certification. A device may comprise, for example, at least combined AKS and TPM resources that load AKS and TPM firmware (FW) into a runtime environment in the device. The runtime environment may further include at least an operating system (OS) encryption module, an AKS service module and a TPM Certification and Attestation (CA) module. The CA module may be to interact with certification and attestation platforms located outside of the device (e.g., in a remote resources accessible via a network). For TPM certification, the CA module may interact with the other modules in the runtime environment to generate a TPM certificate, signed by an AKS certificate, that may be transmitted to the certification platform for validation. For TPM attestation, the CA module may cause TPM credentials to be provided to the attestation platform for validation, which may be provided along with the TPM certificate and/or the AKS certificate.

In at least one embodiment, a device supporting TPM certification and attestation using an AKS may comprise a communication module, combined AKS and integrated TPM resources, and a runtime environment. The communication module may be to communicate with at least a remote resource. The combined AKS and integrated TPM resources may be to load an AKS and TPM firmware module into the runtime environment. The runtime environment may further include at least an operating system encryption module, an AKS service module and an interface module to interact with at least a certification platform in the remote resource via the communication module.

In at least one embodiment, the interface module may further be to cause an AKS certificate to be requested by the service module from the firmware module; and interact with the encryption module to generate a TPM key handle and to initiate finalization of a TPM certificate based on at least one the TPM key handle and the AKS certificate. The anonymous key system and trusted platform module firmware module may comprise an anonymous key system firmware module loaded into a first trusted execution environment and a separate trusted platform module firmware module loaded into a second trusted execution environment. The encryption module may further be to interact with the firmware module to generate the TPM certificate based on at least the TPM key handle and to sign the trusted platform module certificate using the AKS certificate and to provide the signed TPM certificate to the interface module. The interface module may further be to cause the communication module to transmit the signed TPM certificate to the certification platform, and to receive a message from the certification platform via the communication module, the message at least indicating that signed TPM certificate is valid.

In the same or a different embodiment, the interface module may further be to receive a request for TPM credentials from an attestation platform in the remote resource via the communication module, and to cause the encryption module to obtain at least the TPM credentials and the TPM certificate from the firmware module. The interface module may further be to cause the communication module to transmit a response to the request, the response including at least the TPM credentials for validation by the attestation platform, and to receive a message from the attestation platform via the communication module, the message at least indicating at least that the TPM credentials have been validated. In at least one embodiment, the response to the request may further comprise the AKS certificate or the TPM certificate for the attestation platform to use in validating the TPM credentials. In an alternative embodiment, the response to the request may further comprise the AKS certificate for the attestation platform to use in validating the TPM certificate and the TPM certificate for the attestation platform to use in validating the TPM credentials. Consistent with the present disclosure, an example method for TPM certification and attestation using an anonymous key system may comprise loading a combined AKS and TPM firmware module into a runtime environment in a device, the runtime environment further including at least an operating system encryption module, an AKS service module, an interface module to interact with at least a certification platform in a remote resource, and triggering at least one of TPM certification or TPM attestation in the device.

FIG. 1 illustrates an example system for TPM certification and attestation utilizing an anonymous key system in accordance with at least one embodiment of the present disclosure. System 100 may comprise, for example, at least device 102 and remote resource 104. Examples of user device 102 may comprise, but are not limited to, a mobile communication device such as a cellular handset or smartphone based on the Android® OS from the Google Corporation, iOS® and/or Mac® OS from the Apple Corporation, Windows® OS from the Microsoft Corporation, Tizen® OS from the Linux Foundation, Firefox® OS from the Mozilla Project, Blackberry® OS from the Blackberry Corporation, Palm® OS from the Hewlett-Packard Corporation, Symbian® OS from the Symbian Foundation, etc., a mobile computing device such as a tablet computer like an iPad® from the Apple Corporation, Nexus® from the Google Corporation, Surface® from the Microsoft Corporation, Galaxy Tab® from the Samsung Corporation, Kindle Fire® from the Amazon Corporation, etc., an Ultrabook® including a low-power chipset manufactured by Intel Corporation, a netbook, a notebook, a laptop, a palmtop, etc., a typically stationary computing device such as a desktop computer, a smart television, small form factor computing solutions (e.g., for space-limited applications, TV set-top boxes, etc.) like the Next Unit of Computing (NUC) platform from the Intel Corporation, etc. Remote resource 104 may comprise at least one computing device accessible to user device 102 via a network connection. Example networks may include, but are not limited to, a local-area network (LAN), a wide-area network (WAN) like the Internet, a global-area network (GAN), etc. In at least one embodiment, remote resource 104 may comprise at least one data server operating as part of a cloud computing architecture. A cloud computing architecture may comprise, for example, a plurality of data servers operating individually or in unison to provide various data processing-related services to user device 102.

Device 102 may comprise, for example, at least AKS and integrated TPM resources 106, and runtime environment (RE) 108. AKS and integrated TPM resources 106 may comprise both a memory (e.g., including at least an AKS certificate) and cryptographic processing hardware for supporting both AKS and integrated TPM. In general, AKS may be a digital signature scheme capable of generating digital signatures for authenticating data sources while keeping the identity of the source anonymous. Enhanced Privacy ID (EPID) technology from the Intel Corporation is an example of an AKS. For example, in EPID an Intel Key Generation Facility (IKGF) may issue a group certificate comprising a common public key along with private keys corresponding to the public key. After several million private keys corresponding to the same public key have been generated, a new group may be created. An EPID private key may be used to "sign" data, the private key signature being verifiable using the EPID pubic key. The private key may be provisioned to a device (e.g., inside of AKS and integrated TPM resources 106 in device 102) at the time of manufacturing. Given that there are a number of private keys that match the same public key, the signature verifier has no direct knowledge of which device 102 signed the information. This is a key privacy requirement satisfied by an AKS like EPID. It is important to note that while EPID is an example of an AKS, that embodiments consistent with the present disclosure are not limited to implementation using EPID, and may be implemented based on another AKS existing now or in the future. TPM is a standard cryptographic system that may be employed to generate certificates, keys, etc. for use in security-related operations. For example TPM may generate a nearly unforgeable hash-based key (e.g., TPM credentials) that may summarize the current hardware and software configuration of device 102. The TPM credentials may be validated by a third party such as, for example, attestation platform (AP) 120 to verify that the configuration of device 102 has not changed since it was first TPM certified, which may attest to device 102 still being a "trusted" platform (e.g., not compromised by a hacker, malware, etc.). Again, while TPM is referenced in the present disclosure, TPM is merely an example of a device integrity platform in use today, and is not meant to limit any of the various systems and/or methodologies disclosed herein to being employed exclusively with TPM. The various disclosed embodiments may be equally applicable to other trust architectures existing now or in the future.

RE 108 may comprise equipment and/or software in device 102 to support operational modules including, for example, AKS and TPM FW module 110 (hereafter, "FW module 110"), OS encryption module 112 (hereafter, "encryption module 112"), AKS service module 114 (hereafter "service module 114") and CA module 116. Examples of equipment that may make up RE 108 will be discussed with respect to FIG. 3. In general, operational modules 110 to 116 in RE 108 may perform various activities in support of the handling of the AKS certificate, and the generation of the TPS certificate and TPS credentials for device 102. FW module 110 may process commands received from other modules 112 to 116 associated with AKS and/or TPM. Encryption module 112 may comprise an OS-specific encryption description provided with the OS of device 102 (e.g., Microsoft Windows, Apple Mac OS, Linux, etc.). Utilizing Windows 8 and EPID as an example, some modifications in the OS Bcrypt/NCrypt library functions may be required for processing EPID. These extensions may be integrated inside Windows 8 or may be provided by Intel unique extensions to the BCrypt/NCrypt library modules. Service module 114 may comprise a dynamically linked library (DLL) for managing the AKS private key, TPM key handle (e.g., the TPM key handle points to the location of the TPM key) and the TPM certificate. CA 116 may be an interface through which modules 110 to 114 may interact with certification platform (CP) 118 for TPM device certification and attestation platform (AP) 120 during TPM attestation operations wherein the trusted platform status of device 102 may be validated. In one embodiment, CA 116 may comprise anti-malware features to protect device 102 from attack. In the same or a different embodiment, the certification functionality provided by CA 118 and the attestation functionality provided by AP 120 may be performed by the same entity (e.g., CA 118 and AP 120 may be combined in a single device, or group of devices, in remote resource 104).

Figure 2:
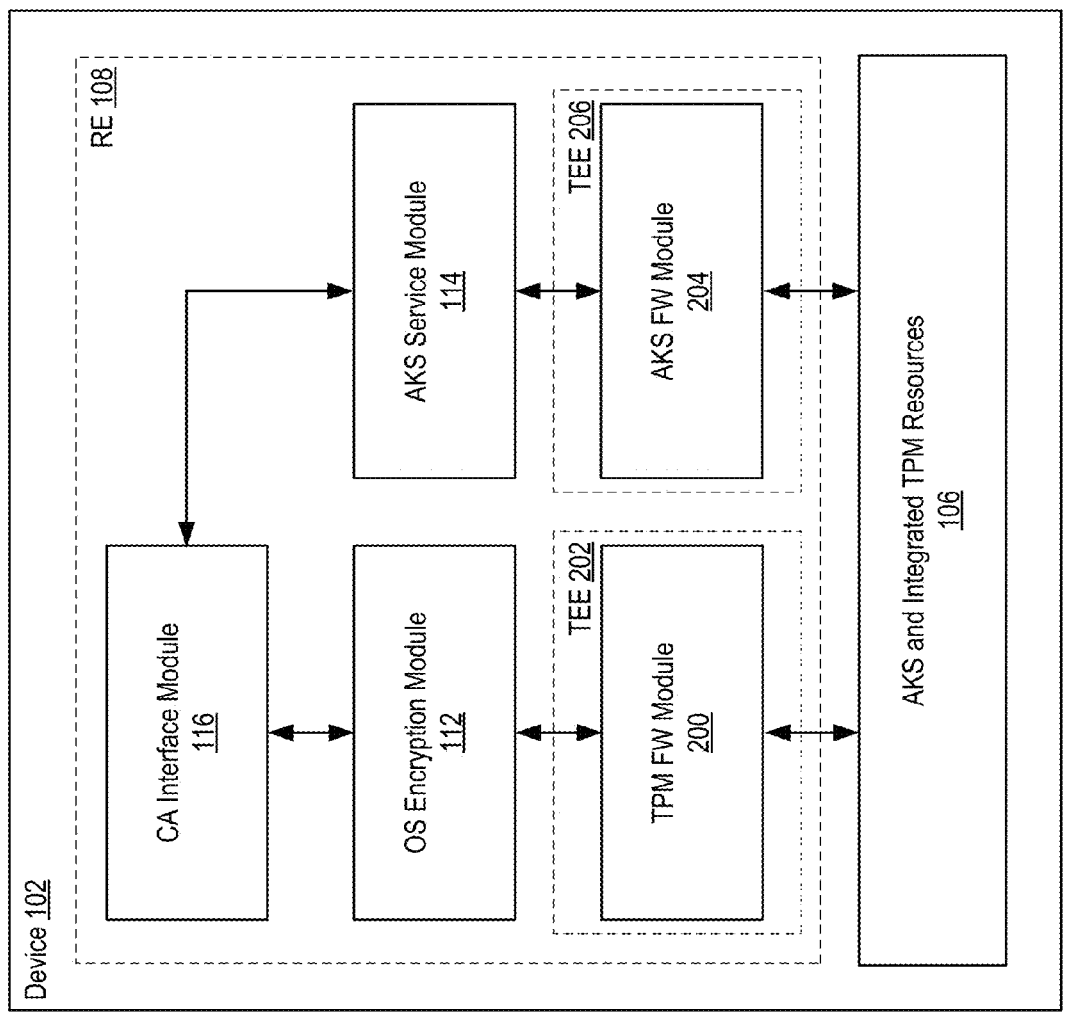
FIG. 2 illustrates an alternative example system for TPM certification and attestation utilizing an anonymous key system comprising trusted execution environments in accordance with at least one embodiment of the present disclosure.

FIG. 2 illustrates an alternative example system for TPM certification and attestation utilizing an anonymous key system comprising trusted execution environments in accordance with at least one embodiment of the present disclosure. In the example disclosed in FIG. 2, FW module 110 may be loaded as two separate firmware modules. For example, TPM FW module 200 may be loaded into trusted execution environment (TEE) 202 and AKS FW module 204 may be loaded into TEE 206. TEEs 204 and 206 may comprise protected areas of memory in which known-good programs may execute, confidential information may be stored in a secure manner, etc. In general, TEEs 204 and 206 may each comprise a set of computing resources that are secure such that programs executing within TEEs 204 and 206, and any data associated with the executing programs, are isolated. Outside actors cannot be interfere with or observe the programs/data within TEEs 204 and 206 during program execution with the exception that the program may be started or stopped and the associated data may be inserted or deleted. Any data leaving TEEs 204 and 206 may be released in a controlled manner. Consistent with the present disclosure, at least one known-good program executing within each of TEEs 204 and 206 may perform any or all operations disclosed herein in regard to TEEs 204 and 206. In one example implementation, TEEs 204 and 206 may employ Software Guard Extensions (SGX) technology developed by the Intel Corporation. SGX may provide a secure and hardware-encrypted computation and storage area within system memory, the contents of which cannot be deciphered by privileged code or even through the application of hardware probes to memory bus. When TEEs 204 and 206 are protected by SGX, embodiments consistent with the present disclosure make it impossible for intruders to decipher the contents of TEEs 204 and 206. Protected data cannot be observed outside of SGX, and thus, is inaccessible outside of SGX.

In an example implementation wherein TEEs 204 and 206 employ SGX, the identity of programs (e.g., based on a cryptographic hash measurement of each program's contents) may be signed and stored inside each program. When the programs are then loaded into SW 112, the processor may verify that the measurement of the program (e.g., as computed by the processor) is identical to the measurement previously embedded inside the program. The signature used to sign the embedded measurement is also verifiable because the processor may be provided with a public key used to verify the signature at program load time. This way malware can't tamper with the program without also altering its verifiable measurement. Malware also cannot spoof the signature because the signing key is secure with the program's author. Thus, the software may not be read, written to or altered by any malware. Moreover, data may also be protected in TEE module 106. For example, known-good programs in SW 112 may encrypt data such as keys, passwords, licenses, etc. so that only verified good programs may decrypt this data. At least one benefit of having at least two separate TEE modules 202 and 206 is that if either TEE module 202 or TEE module 206 malfunctions or becomes compromised, the remaining TEE will still be intact and protecting either TPM FW module 200 or AKS FW module 204, respectively.

Consistent with the present disclosure, AKS FW module 200 may be utilized to attest to operations performed by TPM FW module 204 via, for example, a separable attestation channel. The separable attestation channel may provide evidence to mistrust TPM FW module 200 should TEE 202 become compromised. The signing (e.g., certification) of a TPM certificate by an AKS certificate may confirm that AKS FW module 204, which is isolated from TPM FW module 200, asserts the TPM environment, including protection of the TPM keys, is intact, trustworthy, etc. At least one benefit of this arrangement that TPM FW module 200 may be able to process TPM "field upgrade" commands and other TPM operations that would normally call into question the trustworthiness of TPM FW module 200, but without the trust concerns due to the presence of AKS FW module 204 isolated in TEE 206. This confidence may exist because AKS FW module 204 may objectively evaluate the trust of TPM FW module 200. In at least one embodiment, AKS FW module 204 may be more constrained and less complex than TPM FW module 200.

Figure 3:
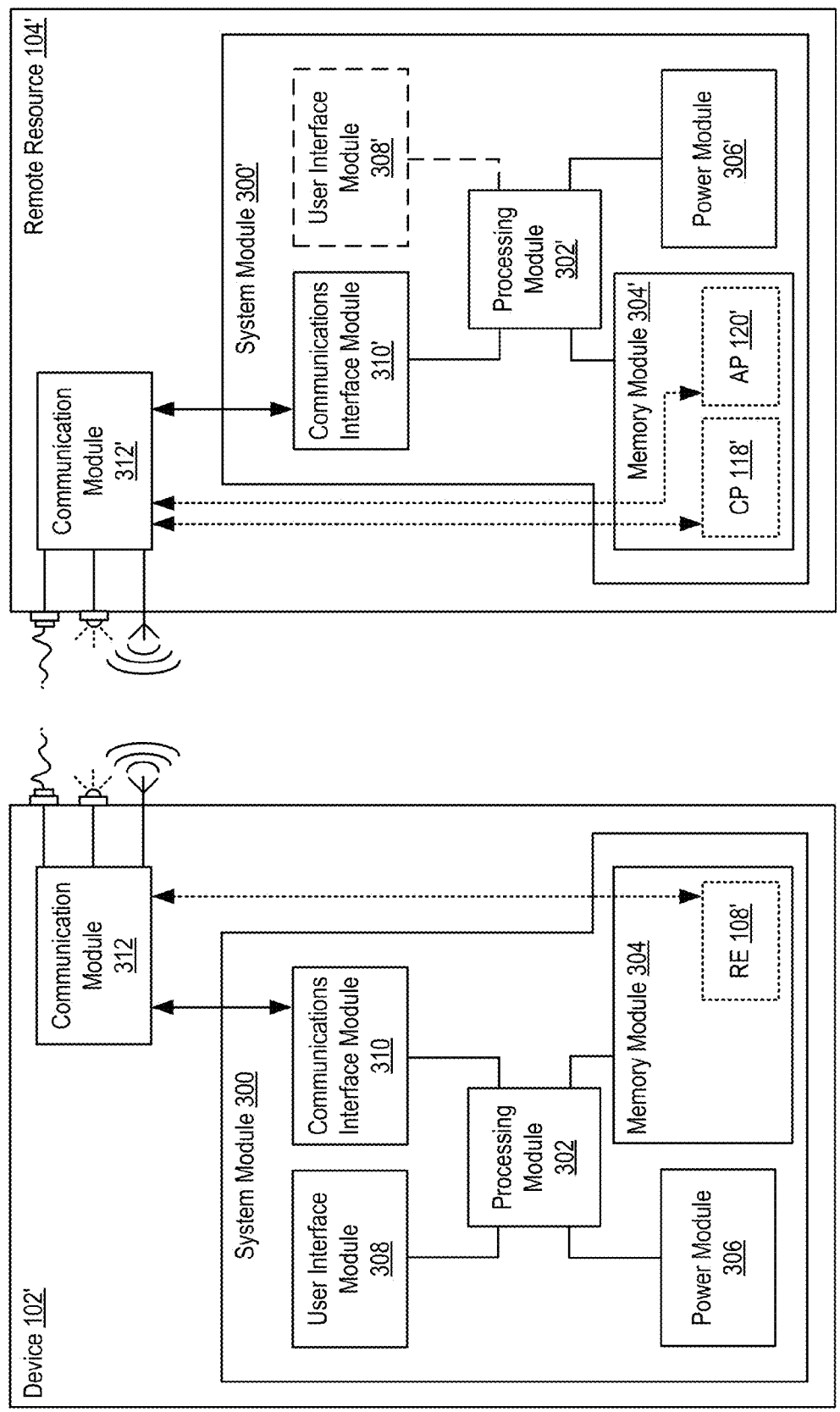
FIG. 3 illustrates example configurations for a device and at least one device making up a remote resource usable in accordance with at least one embodiment of the present disclosure.

FIG. 3 illustrates example configurations for a device and at least one device making up a remote resource usable in accordance with at least one embodiment of the present disclosure. In particular, device 102' and/or remote resource 104' may be capable of performing example functionality such as disclosed in FIG. 1. However, device 102' and remote resource 104' are meant only as examples of apparatuses that may be usable in embodiments consistent with the present disclosure, and are not meant to limit these various embodiments to any particular manner of implementation.

Device 102' may comprise, for example, system module 300 configured to manage device operations. System module 300 may include, for example, processing module 302, memory module 304, power module 306, user interface module 308 and communication interface module 310. Device 102' may also include communication module 312. While communication module 312 has been illustrated as separate from system module 300, the example implementation shown in FIG. 3 has been provided merely for the sake of explanation. Some or all of the functionality associated with communication module 312 may be incorporated into system module 300.

In device 102', processing module 302 may comprise one or more processors situated in separate components, or alternatively, one or more processing cores embodied in a single component (e.g., in a System-on-a-Chip (SoC) configuration) and any processor-related support circuitry (e.g., bridging interfaces, etc.). Example processors may include, but are not limited to, various x86-based microprocessors available from the Intel Corporation including those in the Pentium, Xeon, Itanium, Celeron, Atom, Core i-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing module 302 may interact with other system components that may be operating at different speeds, on different buses, etc. in device 102'. Some or all of the functionality commonly associated with the support circuitry may also be included in the same physical package as the processor (e.g., such as in the Sandy Bridge family of processors available from the Intel Corporation).

Processing module 302 may be configured to execute various instructions in device 102'. Instructions may include program code configured to cause processing module 302 to perform activities related to reading data, writing data, processing data, formulating data, converting data, transforming data, etc. Information (e.g., instructions, data, etc.) may be stored in memory module 304. Memory module 304 may comprise random access memory (RAM) or read-only memory (ROM) in a fixed or removable format. RAM may include volatile memory configured to hold information during the operation of device 102' such as, for example, static RAM (SRAM) or Dynamic RAM (DRAM). ROM may include non-volatile (NV) memory modules configured based on BIOS, UEFI, etc. to provide instructions when device 102' is activated, programmable memories such as electronic programmable ROMs (EPROMS), Flash, etc. Other fixed/removable memory may include, but are not limited to, magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Disks, etc.

Power module 306 may include internal power sources (e.g., a battery, fuel cell, etc.) and/or external power sources (e.g., electromechanical or solar generator, power grid, external fuel cell, etc.), and related circuitry configured to supply device 102' with the power needed to operate. User interface module 308 may include hardware and/or software to allow users to interact with device 102' such as, for example, various input mechanisms (e.g., microphones, switches, buttons, knobs, keyboards, speakers, touch-sensitive surfaces, one or more sensors configured to capture images and/or sense proximity, distance, motion, gestures, orientation, biometric data, etc.) and various output mechanisms (e.g., speakers, displays, lighted/flashing indicators, electromechanical components for vibration, motion, etc.). The hardware in user interface module 308 may be incorporated within device 102' and/or may be coupled to device 102' via a wired or wireless communication medium.

Communication interface module 310 may be configured to manage packet routing and other control functions for communication module 312, which may include resources configured to support wired and/or wireless communications. In some instances, device 102' may comprise more than one communication module 312 (e.g., including separate physical interface modules for wired protocols and/or wireless radios) managed by a centralized communication interface module 310. Wired communications may include serial and parallel wired mediums such as, for example, Ethernet, Universal Serial Bus (USB), Firewire, Thunderbolt, Digital Video Interface (DVI), High-Definition Multimedia Interface (HDMI), etc. Wireless communications may include, for example, close-proximity wireless mediums (e.g., radio frequency (RF) such as based on the RF Identification (RFID) or the Near Field Communications (NFC) standards, infrared (IR), etc.), short-range wireless mediums (e.g., Bluetooth, WLAN, Wi-Fi, etc.), long range wireless mediums (e.g., cellular wide-area radio communication technology, satellite-based communications, etc.), electronic communications via sound waves, etc. In one embodiment, communication interface module 310 may be configured to prevent wireless communications that are active in communication module 312 from interfering with each other. In performing this function, communication interface module 310 may schedule activities for communication module 312 based on, for example, the relative priority of messages awaiting transmission. While the embodiment disclosed in FIG. 3 illustrates communication interface module 310 being separate from communication module 312, it may also be possible for the functionality of communication interface module 310 and communication module 312 to be incorporated into the same module.

Consistent with the present disclosure, at least part of RE 108 (e.g., RE 108' which may comprise at least a software portion of RE 108) may reside in memory module 306. Similarly at least part of CP 118' and AP 120' may reside in remote resource 104'. Remote resource 104' may comprise computing resources that are substantially similar to user device 102' including, for example, system module 300', processing module 302', memory module 304', power module 306', user interface module 308', communications interface module 310' and communication module 312'. Additions or subtractions to modules 300' to 312' may be based on the particular implementation of remote resource 104'. For example, given remote resource 104' comprises a rack server (e.g., in a cloud computing architecture), some or all of user interface module 308' may be omitted to save space for processors, storage, etc., the user interface functionality being provided by a remote client station when required. Operational modules in RE 108' (e.g., CA module 116), may interact with CP 118' and/or AP 120' by causing communication module 312 to send messages that may be received in remote resource 104' via communication module 312'.

Figure 4:
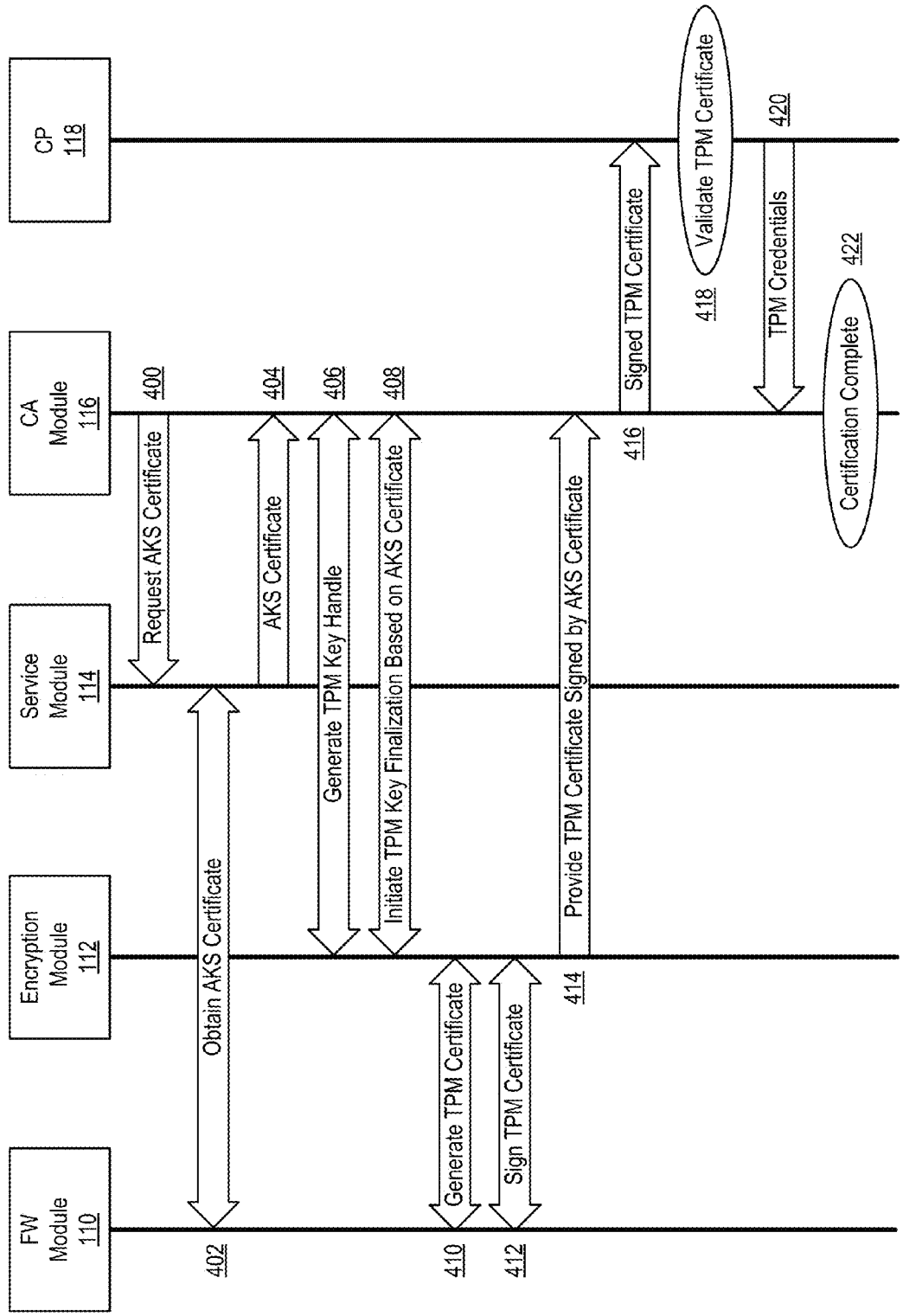
FIG. 4 illustrates an example of certification in accordance with at least one embodiment of the present disclosure.

FIG. 4 illustrates an example of certification in accordance with at least one embodiment of the present disclosure. In general, FIG. 4 discloses an example of interactions that may occur between operational modules 110 to 116 and CP 118 during the TPM certification of device 102. TPM certification may be initiated by, for example, activating (e.g., booting or rebooting) device 102, activating an application in device requiring TPM certification, by manual configuration of device 102, etc. CA module may then request that service module 114 obtain the device's AKS certificate at 400. Service module 114 may then interact with FW module 110, as shown at 402, to cause FW module 110 to retrieve the AKS certificate from, for example, storage in AKS and integrated TPM resources 106. Service module 114 may then provide the AKS certificate to CA module 116 at 404.

CA module 116 may interact with encryption module 112 to generate a TPM key handle as shown at 406, and then may initiate TPM key finalization based on the AKS certificate at 408. Encryption module 112 may then interact with FW module 110 to cause a TPM certificate to be generated at 410, and then for the TPM certificate to be signed at 412. Encryption module 112 may then provide the TPM certificate signed by the AKS certificate to CA module 116 at 414, which may proceed to cause device 102 to transmit the signed TPM certificate to CP 118 at 416. TPM certification may initially comprise, for example, CP 118 validating the AKS signature on the TPM certificate, and then generating TPM credentials for device 102 based on the TPM certificate at 418. CP 118 may then transmit at least the TPM credentials back to CA module 116 in device 102 at 420. Device 102 may then be considered successfully TPM certified at 422.

While not disclosed in the operations shown in FIG. 4, CP 118 may also be responsible for revoking TPM credentials in device 102. CP 118 may manage a list of rogue devices 102. It may also maintain a list of TPM credentials issued for those devices. When TPM credentials are revoked, all corresponding TPM certificates must be revoked as well. For example, assuming a TPM certificate needs to be revoked because of an exploited TPM FW vulnerability, at least one solution would first comprise the AKS certificate issuer first revoking all AKS certificates for an effected public key group. However, the revocation of an AKS group certificate would affect all of the private key holders in the key group, and thus, such large scale revocation may prove to be overkill unless there is a widespread systemic problem. It may be possible for the AKS systems in device 102 to be intact regardless of the TPM system state. As disclosed in FIG. 2, in at least one embodiment AKS and TPM systems may be isolated in device 102. Attestation of TPM FW module 200 would be revealed in the attestation of TEE 202. AKS FW module 204 should then refuse to sign (endorse) the TPM certificate under these conditions. Regardless of how the TPM and/or AKS FW flaw is determined (e.g., based on the implementation of device 102), CP 118 may then revoke the TPM root key was associated with the bad version of the TPM FW. CP 118 may then issue a certificate revocation list (CRL) update to its CRL distribution servers which, in at least one example implementation, are downloaded periodically (e.g., on a weekly basis). The revocation of the TPM credentials may be realized on the next attempted use of TPM credentials by device 102. The TPM software on device 102 would be notified of the revocation and would trigger a TPM FW update to fix the vulnerability that caused the original revocation.

Figure 5:
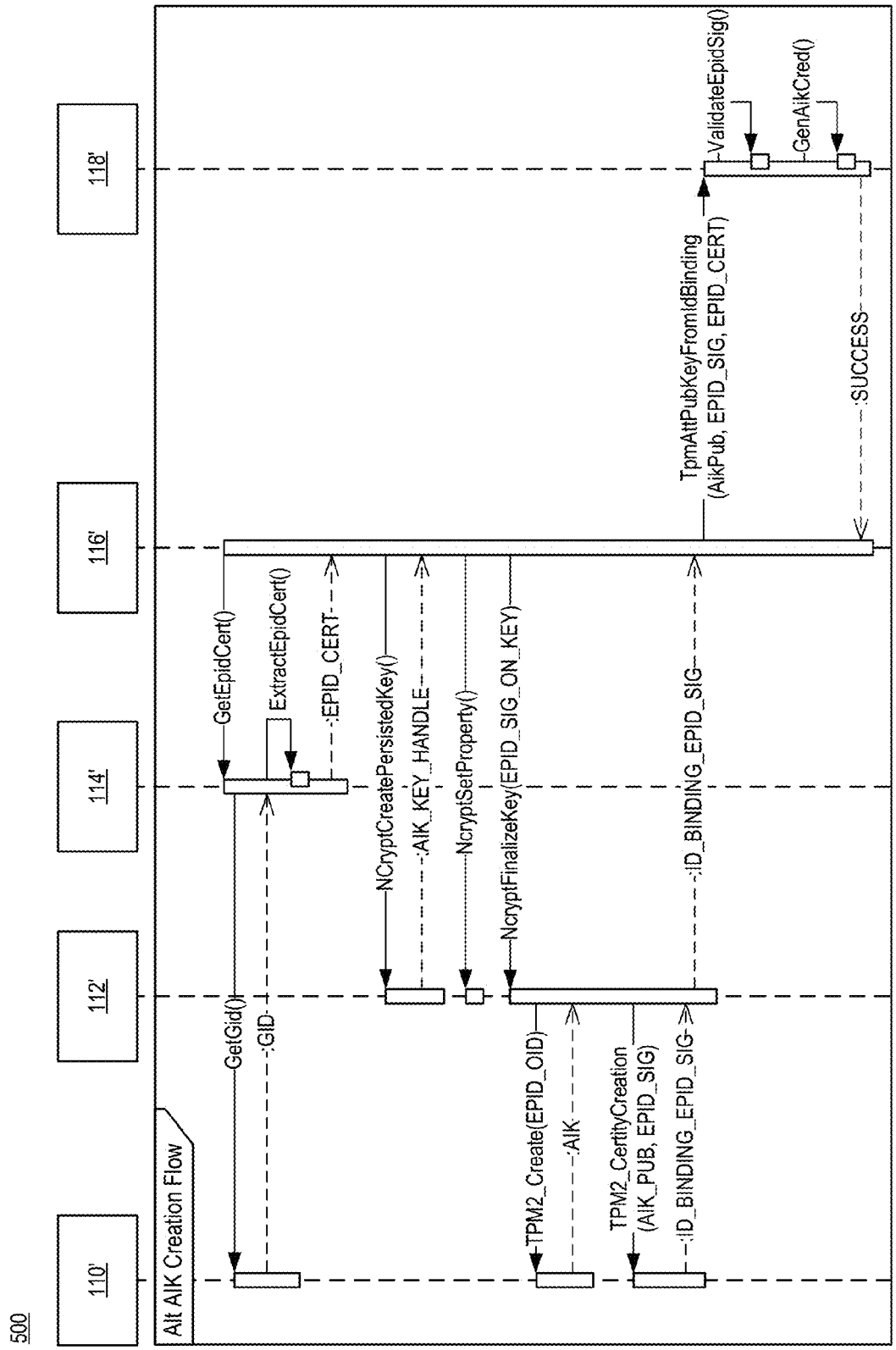
FIG. 5 illustrates an example implementation of certification in accordance with at least one embodiment of the present disclosure.

FIG. 5 illustrates an example implementation of certification in accordance with at least one embodiment of the present disclosure. In particular, example implementation 500 utilizes EPID on a device 102 running a Windows OS. TPM certification may start by CA module 116' initially issuing a GetEpidCert( ) command to service module 114', which may cause service module 114' to subsequently transmit a GetGid( ) instruction to FW module 110'. FW module 110' may then return a :GID including an EPID certification. Service module 114' may extract the EPID certification as shown by the ExtracEpidCert( ) instruction, and the :EPID_CERT may be sent to CA module 116'. CA module 116' may then issue an NCryptCreatePersistedKey( ) instruction to Encryption module 112', which may provide the :AIK_KEY_HANDLE back to CA module 116'. CA module 116' may then issue an NcryptSetProperty( ) command to Encryption module 112', followed by an NcryptFinalizeKey(EPID_SIG_ON_KEY) command to cause encryption module 112' to work with FW module 110' to generate the signed TPM key.

Encryption module 112' may then issue a TPM2_Create (EPID_OID) instruction to FW module 110', which may respond with an attestation identity key (AIK) that may correspond to the TPM certificate in FIG. 4. A TPM2_CertifyCreation(AIK_PUB_EPID_SIG) command may then be used by Encryption module 112' to instruct FW module 110' to sign the AIK with the EPID certificate. The signed AIK certificate (e.g., :ID_BINDING_EPID_SIG) may then be provided to CA module 116', which may transmit the ID_BINDING_EPID_SIG to CP 118' in a TpmAttPubKeyFromIdBinding(AikPub, EPID_SIG, EPID_CERT) message. CP 118' may ValidateEpidSig( ) (e.g., validate the EPID signature on the AIK) and then GenAikCred( ) (e.g., generate AIK credentials) which are then transmitted back to CA module 116' as :SUCCESS.

Figure 6:
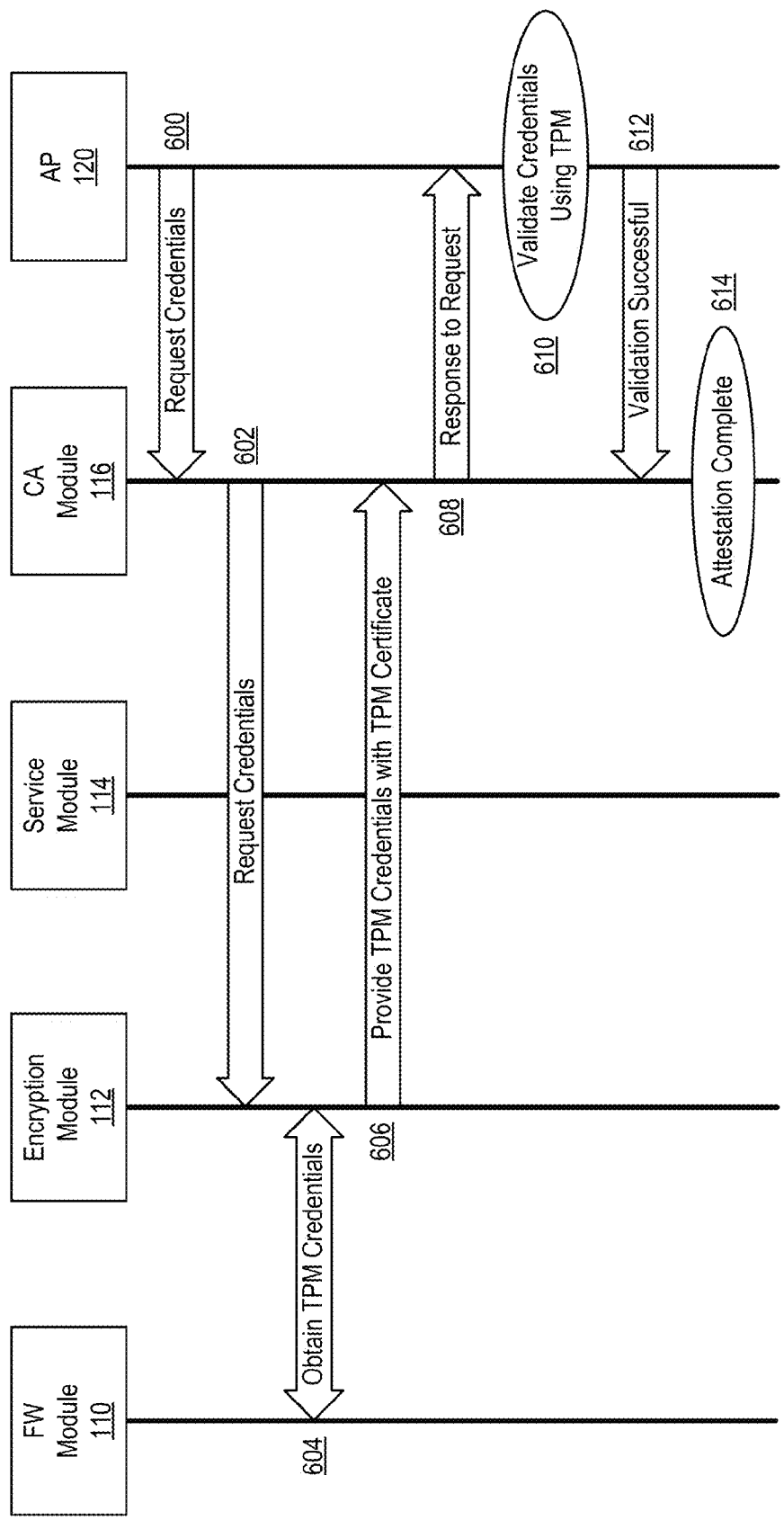
FIG. 6 illustrates an example of attestation in accordance with at least one embodiment of the present disclosure.

FIG. 6 illustrates an example of attestation in accordance with at least one embodiment of the present disclosure. In general, FIG. 6 discloses an example of interactions that may occur between operational modules 110 to 116 and CP 118 during the attestation of the TPM "trusted platform" status of device 102. AP 120 may initiate attestation by requesting TPM credentials from device 102 via CA module 116 at 600. CA module 116 may then request TPM credentials from encryption module as shown at 602. The request received at 602 may cause encryption module 112 to interact with FW module 602 to obtain the TPM credentials as shown at 604. Encryption module 12 may then provide the TPM credentials, along with the TPM certificate, to CA module 116 at 606, and the CA module may cause device 102 to transmit a response to the request at 608, the response including at least the TPM credentials and TPM certificate. As shown at 610, AP 120 may then validate the TPM credentials using the TPM certificate that was provided in the response, and if validated, may transmit a confirmation of successful validation to CA module 116 at 612. Device 102 may then be considered a "trusted platform" at 614.

Figure 7:
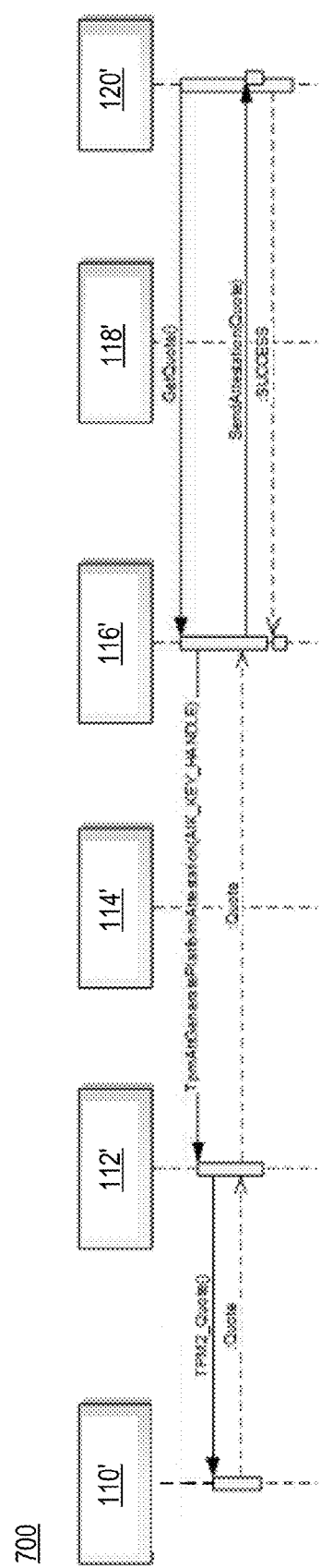
FIG. 7 illustrates an example implementation of attestation in accordance with at least one embodiment of the present disclosure.

FIG. 7 illustrates an example implementation of attestation in accordance with at least one embodiment of the present disclosure. In particular, example implementation 700 utilizes EPID on a device 102 running a Windows OS. AP 120' may transmit a GetQuote command to CA module 116'. A TpmAttGeneratePlatformAttestation(AIK_KEY_HANDLE) instruction may then be sent from CA module 116' to encryption module 112', which cause encryption module 112' to send a TPM2_Quote( ) command to FW module 110' A quote (e.g., TPM credentials) may then be forwarded from FW module 110' to encryption module 112' to CA module 116'. CA module 116' may then cause device 102 to transmit a SendAttestation(Quote) message to AP 120', which may validate the quote. If the quote is validated, AP 120' may send :SUCCESS message notifying CA module 116' in device 102 that validation was successful.

Figure 8:
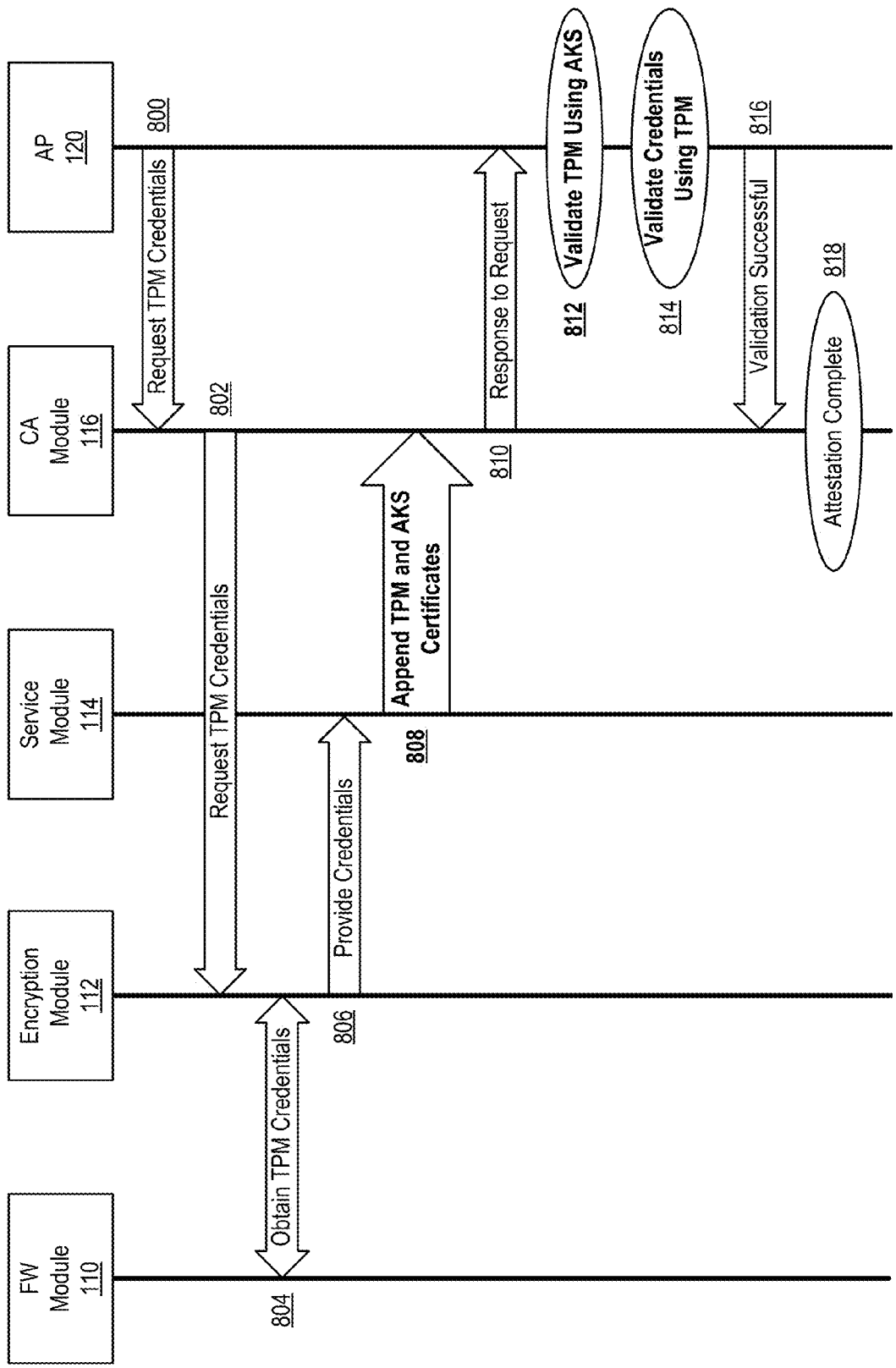
FIG. 8 illustrates an alternative example of attestation including secondary validation in accordance with at least one embodiment of the present disclosure.

FIG. 8 illustrates an alternative example of attestation including secondary validation in accordance with at least one embodiment of the present disclosure. In general, the operations in FIG. 8 disclose attestation operations wherein both the AKS certificate and TPM certificate are used to validate the trusted platform status of device 102. From a structural standpoint, modules 110 to 114 (e.g., as shown in FIG. 1) may be the same. However, in the embodiment disclosed in FIG. 8, CA module 116 may retain the AKS certificate and the TPM certificate signed by the AKS certificate, and may append to the attestation response the TPM credential signed by the TPM certificate, the TPM certificate signed by the AKS certificate and the AKS certificate. The attestation operation may then be modified to accept a signature-based revocation list (SIG-RL) structure which may be included in the AKS signing operation. The TPM certificate signed by AKS key may then be verified by the AP 120 as part of a TPM certificate enrollment protocol (e.g., utilizing a Public Key Cryptography Standard (PKCS) #10 with an extension containing an AKS signature). AKS signature verification may then check for signature revocation in addition to group certificate revocation using certificate revocation lists (CRLs). AP 118 may also include a policy object identifier (OID) indicating that the TPM certificate was attested using the AKS certificate and that CA validated the signature. Optionally, the PK#10 extension may be included directly into the certificate for third party verification and inspection.

In FIG. 8, the module interactions illustrated at 800 to 806 may be substantially the same as interactions 500 to 506 illustrated in FIG. 6. However, at 808 service module 114 may append the TPM credentials, the TPM certificate and the AKS certificate to the response sent to AP 120 at 810. AP 120 may then validate the TPM certificate using the AKS certificate at 812, and then may validate the TPM credentials using the validated TPM certificate at 814. Similar to FIG. 5, if validation is successful at 812 and 814, then a success message may be sent from AP 120 to CA module 116 as shown at 816, and device 102 may be considered a trusted platform at 818.

Figure 9:
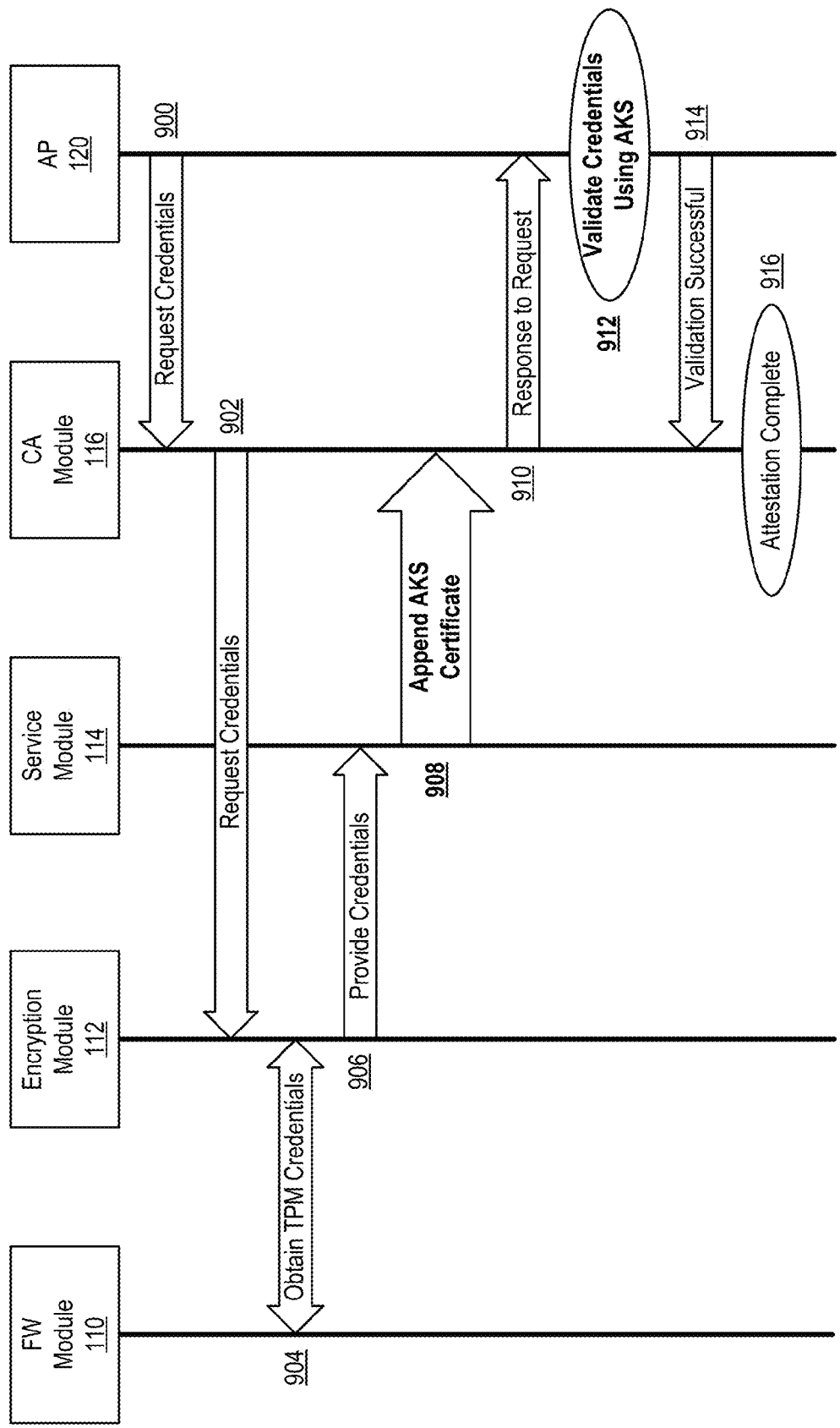
FIG. 9 illustrates an alternative example of attestation including AKS-based validation in accordance with at least one embodiment of the present disclosure.

FIG. 9 illustrates an alternative example of attestation including AKS-based validation in accordance with at least one embodiment of the present disclosure. In general, the operations in FIG. 9 disclose attestation operations wherein AP 120 may utilize only the AKS certificate to validate the TPM credentials, eliminating the need for certification of the TPM credentials as disclosed in FIGS. 3 and 4. Similar to FIG. 8, modules 110 to 114 (e.g., as shown in FIG. 1) may be the same. However, CA module 116 may able to retain the AKS Certificate and to append the TPM quote response with the AKS Certificate. The quote interface may be modified to accept a SIG-RL revocation structure that is included in the AKS signature operation. In addition, AP 120 must be able to verify TPM credentials signed using AKS-based signature algorithm. AKS signature validation checks for signature revocation in addition to group certificate revocation using CRLs. In at least one embodiment, AKS certificate validation may also be offloaded to another entity (e.g., another server in remote resource 104) which the requestor is able to trust.

In FIG. 9, the module interactions illustrated at 900 to 906 may be substantially the same as interactions 500 to 506 illustrated in FIG. 5 and interactions 700 to 706 illustrated in FIG. 7. However, at 908 only the TPM credentials and the AKS certificate may be appended to the response. CA module 116 may then cause device 102 to transmit the response to AP 120, which may validate the TPM credentials based on the AKS certificate at 912. Similar to FIGS. 5 and 7, if validation is successful at 912, then a success message may be transmitted from AP 120 to CA module 116 as shown at 914, and device 102 may be considered a trusted platform at 916.

While FIGS. 4 and 6 illustrate operations according to different embodiments, it is to be understood that not all of the operations depicted in FIGS. 4 and 6 are necessary for other embodiments. Indeed, it is fully contemplated herein that in other embodiments of the present disclosure, the operations depicted in FIGS. 4 and 6, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions.

Other embodiments may be implemented as software modules executed by a programmable control device.

Thus, this application is directed to trusted platform certification and attestation utilizing an anonymous key system. In general, TPM certification and TPM attestation may be supported in a device utilizing integrated TPM through the use of anonymous key system (AKS) certification. An example device may comprise at least combined AKS and TPM resources that load AKS and TPM firmware (FW) into a runtime environment that may further include at least an operating system (OS) encryption module, an AKS service module and a TPM Certification and Attestation (CA) module. For TPM certification, the CA module may interact with the other modules in the runtime environment to generate a TPM certificate, signed by an AKS certificate, that may be transmitted to a certification platform for validation. For TPM attestation, the CA module may cause TPM credentials to be provided to the attestation platform for validation along with the TPM and/or AKS certificates.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for TPM certification and attestation utilizing an anonymous key system, as provided below.

According to example 1 there is provided a device for supporting trusted platform module certification and attestation using an anonymous key system. The device may comprise a communication module to communicate with at least a remote resource and combined anonymous key system and integrated trusted platform module resources to load an anonymous key system and trusted platform module firmware module into a runtime environment in the device, the runtime environment further including at least an operating system encryption module, an anonymous key system service module and an interface module to interact with at least a certification platform in the remote resource via the communication module.

Example 2 may include the elements of example 1, wherein the anonymous key system and trusted platform module firmware module comprises an anonymous key system firmware module loaded into a first trusted execution environment and a separate trusted platform module firmware module loaded into a second trusted execution environment.

Example 3 may include the elements of any of examples 1 to 2, wherein the interface module is further to cause an anonymous key system certificate to be requested by the service module from the firmware module and interact with the encryption module to generate a trusted platform module key handle and to initiate finalization of a trusted platform certificate based on at least one the trusted platform module key handle and the anonymous key system certificate.

Example 4 may include the elements of example 3, wherein the encryption module is further to interact with the firmware module to generate the trusted platform module certificate based on at least the trusted platform module key handle and to sign the trusted platform module certificate using the anonymous key system certificate and provide the signed trusted platform module certificate to the interface module.

Example 5 may include the elements of example 4, wherein the interface module is further to cause the communication module to transmit the signed trusted platform module certificate to the certification platform and receive a message from the certification platform via the communication module, the message at least indicating that signed trusted platform module certificate is valid.

Example 6 may include the elements of any of examples 3 to 5, wherein the interface module is further to receive a request for trusted platform module credentials from an attestation platform in the remote resource via the communication module and cause the encryption module to obtain at least the trusted platform module credentials and the trusted platform module certificate from the firmware module.

Example 7 may include the elements of example 6, wherein certification and attestation are handled by the same platform.

Example 8 may include the elements of any of examples 6 to 7, wherein the interface module is further to cause the communication module to transmit a response to the request, the response including at least the trusted platform module credentials for validation by the attestation platform and receive a message from the attestation platform via the communication module, the message at least indicating at least that the trusted platform module credentials have been validated.

Example 9 may include the elements of example 8, wherein the response to the request further comprises the anonymous key system certificate or the trusted platform module certificate for the attestation platform to use in validating the trusted platform module credentials.

Example 10 may include the elements of any of examples 8 to 9, wherein the response to the request further comprises the anonymous key system certificate for the attestation platform to use in validating the trusted platform module certificate and the trusted platform module certificate for the attestation platform to use in validating the trusted platform module credentials.

Example 11 may include the elements of any of examples 3 to 10, wherein the interface module is further to receive a request for trusted platform module credentials from an attestation platform in the remote resource via the communication module, cause the encryption module to obtain at least the trusted platform module credentials and the trusted platform module certificate from the firmware module, cause the communication module to transmit a response to the request, the response including at least the trusted platform module credentials for validation by the attestation platform and receive a message from the attestation platform via the communication module, the message at least indicating at least that the trusted platform module credentials have been validated.

Example 12 may include the elements of any of examples 1 to 11, wherein the anonymous key system is based on Enhanced Privacy Identification (EPID) technology.

According to example 13 there is provided a method for trusted platform module certification and attestation using an anonymous key system. The method may comprise loading a combined anonymous key system and trusted platform module firmware module into a runtime environment in a device, the runtime environment further including at least an operating system encryption module, an anonymous key system service module, an interface module to interact with at least a certification platform in a remote resource, and triggering at least one of trusted platform module certification or trusted platform module attestation in the device.

Example 14 may include the elements of example 13, wherein triggering trusted platform module certification comprises causing an anonymous key system certificate to be requested by the service module from the firmware module and interacting with the encryption module to generate a trusted platform module key handle and to initiate finalization of a trusted platform module certificate based on at least one the trusted platform module key handle and the anonymous key system certificate.

Example 15 may include the elements of example 14, and may further comprise interacting with the firmware module to generate the trusted platform module certificate based on at least the trusted platform module key handle and to sign the trusted platform module certificate using the anonymous key system certificate and providing the signed trusted platform module certificate to the interface module.

Example 16 may include the elements of example 15, and may further comprise causing the communication module to transmit the signed trusted platform module certificate to the certification platform and receiving a message from the certification platform via the communication module, the message at least indicating that signed trusted platform module certificate is valid.

Example 17 may include the elements of any of examples 14 to 16, and may further comprise interacting with the firmware module to generate the trusted platform module certificate based on at least the trusted platform module key handle and to sign the trusted platform module certificate using the anonymous key system certificate, providing the signed trusted platform module certificate to the interface module, causing the communication module to transmit the signed trusted platform module certificate to the certification platform and receiving a message from the certification platform via the communication module, the message at least indicating that signed trusted platform module certificate is valid.

Example 18 may include the elements of any of examples 14 to 17, wherein triggering trusted platform module attestation comprises receiving a request for trusted platform module credentials from an attestation platform in the remote resource via the communication module; and causing the encryption module to obtain at least the trusted platform module credentials and the trusted platform module certificate from the firmware module.

Example 19 may include the elements of example 18, wherein certification and attestation are handled by the same platform.

Example 20 may include the elements of any of examples 18 to 19, and may further comprise causing the communication module to transmit a response to the request, the response including at least the trusted platform module credentials for validation by the attestation platform and receiving a message from the attestation platform via the communication module, the message at least indicating at least that the trusted platform module credentials have been validated.

Example 21 may include the elements of example 20, wherein the response to the request further comprises the anonymous key system certificate or the trusted platform module certificate for the attestation platform to use in validating the trusted platform module credentials.

Example 22 may include the elements of any of examples 20 to 21, wherein the response to the request further comprises the anonymous key system certificate for the attestation platform to use in validating the trusted platform module certificate and the trusted platform module certificate for the attestation platform to use in validating the trusted platform module credentials.

Example 23 may include the elements of any of examples 14 to 22, wherein triggering trusted platform module attestation comprises receiving a request for trusted platform module credentials from an attestation platform in the remote resource via the communication module, causing the encryption module to obtain at least the trusted platform module credentials and the trusted platform module certificate from the firmware module, causing the communication module to transmit a response to the request, the response including at least the trusted platform module credentials for validation by the attestation platform and receiving a message from the attestation platform via the communication module, the message at least indicating at least that the trusted platform module credentials have been validated.

Example 24 may include the elements of any of examples 13 to 23, wherein the anonymous key system is based on Enhanced Privacy Identification (EPID) technology.

According to example 25 there is provided a system including at least a device and a remote resource, the system being arranged to perform the method of any of the above examples 13 to 24.

According to example 26 there is provided a chipset arranged to perform the method of any of the above examples 13 to 24.

According to example 27 there is provided at least one machine readable medium comprising a plurality of instructions that, in response to be being executed on a computing device, cause the computing device to carry out the method according to any of the above examples 13 to 24.

According to example 28 there is provided a device configured for trusted platform module certification and attestation using an anonymous key system, the device being arranged to perform the method of any of the above examples 13 to 24.

According to example 29 there is provided a system for trusted platform module certification and attestation using an anonymous key system. The system may comprise means for loading a combined anonymous key system and trusted platform module firmware module into a runtime environment in a device, the runtime environment further including at least an operating system encryption module, an anonymous key system service module, an interface module to interact with at least a certification platform in a remote resource and means for triggering at least one of trusted platform module certification or trusted platform module attestation in the device.

Example 30 may include the elements of example 29, wherein the means for triggering trusted platform module certification comprise means for causing an anonymous key system certificate to be requested by the service module from the firmware module and means for interacting with the encryption module to generate a trusted platform module key handle and to initiate finalization of a trusted platform module certificate based on at least one the trusted platform module key handle and the anonymous key system certificate.

Example 31 may include the elements of example 30, and may further comprise means for interacting with the firmware module to generate the trusted platform module certificate based on at least the trusted platform module key handle and to sign the trusted platform module certificate using the anonymous key system certificate and means for providing the signed trusted platform module certificate to the interface module.

Example 32 may include the elements of example 31, and may further comprise means for causing the communication module to transmit the signed trusted platform module certificate to the certification platform and means for receiving a message from the certification platform via the communication module, the message at least indicating that signed trusted platform module certificate is valid.

Example 33 may include the elements of any of examples 30 to 32, wherein the means for triggering trusted platform module attestation comprise means for receiving a request for trusted platform module credentials from an attestation platform in the remote resource via the communication module and means for causing the encryption module to obtain at least the trusted platform module credentials and the trusted platform module certificate from the firmware module.

Example 34 may include the elements of example 33, wherein certification and attestation are handled by the same platform.

Example 35 may include the elements of any of examples 33 to 34, and may further comprise means for causing the communication module to transmit a response to the request, the response including at least the trusted platform module credentials for validation by the attestation platform and means for receiving a message from the attestation platform via the communication module, the message at least indicating at least that the trusted platform module credentials have been validated.

Example 36 may include the elements of example 35, wherein the response to the request further comprises the anonymous key system certificate or the trusted platform module certificate for the attestation platform to use in validating the trusted platform module credentials.

Example 37 may include the elements of any of examples 35 to 36, wherein the response to the request further comprises the anonymous key system certificate for the attestation platform to use in validating the trusted platform module certificate and the trusted platform module certificate for the attestation platform to use in validating the trusted platform module credentials.

Example 38 may include the elements of any of examples 29 to 37, wherein the anonymous key system is based on Enhanced Privacy Identification (EPID) technology.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A device supporting trusted platform module certification and attestation using an anonymous key system, comprising:
   communication circuitry configured to communicate with at least a remote resource;
   and combined anonymous key system and integrated trusted platform module (TPM) resources to load an anonymous key system and TPM firmware module into a runtime environment in the device, the runtime environment comprising an operating system (OS) encryption module, an anonymous key system service module, and interface circuitry, the interface circuitry configured to communication with at least a certification platform in the remote resource via the communication circuitry; wherein:
   the interface circuitry is further to:
      cause the anonymous key system service module to request an anonymous key system certificate from the anonymous key system and TPM firmware module and interact with the OS encryption module to generate a TPM key handle and to initiate finalization of a TPM certificate based on at least one of the TPM key handle and the anonymous key system certificate;
      receive a request for TPM credentials from an attestation platform in the remote resource via the communication circuitry;
      cause the encryption module to obtain at least the TPM credentials and the TPM certificate from the anonymous key system and TPM firmware module;
      cause the communication circuitry to transmit a response to the request wherein the response includes at least the TPM credentials for validation by the attestation platform; and
   wherein the anonymous key system is based on enhanced privacy identification (EPID) technology.

2. The device of claim 1, wherein the anonymous key system and TPM firmware module comprises an anonymous key system firmware module loaded into a first trusted execution environment and a separate trusted TPM firmware module loaded into a second trusted execution environment.

3. The device of claim 1, wherein the OS encryption module is further to:
   interact with the anonymous key system and TPM firmware module to generate the TPM certificate based at least on the TPM module key handle;
   sign the TPM certificate using the anonymous key system certificate; and
   provide the signed trusted platform module certificate to the interface circuitry.

4. The device of claim 3, wherein the interface circuitry is further to:
   cause the communication circuitry to transmit the signed TPM certificate to the certification platform; and
   receive a message from the certification platform via the communication circuitry, the message at least indicating that signed trusted platform module certificate is valid.

5. The device of claim 1, wherein the interface circuitry is further to:
   receive a message from the attestation platform via the communication circuitry, the message at least indicating at least that the TPM credentials have been validated.

6. The device of claim 5, wherein the response to the request further comprises the anonymous key system certificate or the trusted platform module certificate for the attestation platform to use in validating the trusted platform module credentials.

7. The device of claim 5, wherein the response to the request further comprises:
   the anonymous key system certificate for the attestation platform to use in validating the TPM certificate; and
   the TPM certificate for the attestation platform for use in validating the TPM credentials.

8. A method for trusted platform module certification and attestation using an anonymous key system, comprising:
   loading a combined anonymous key system and trusted platform module (TPM) firmware module into a runtime environment in a device, the runtime environment further comprising at least an operating system (OS) encryption module, an anonymous key system service module, and an interface module to interact with at least a certification platform in a remote resource via communication circuitry of the device; and triggering at least one of trusted platform module certification or trusted platform module attestation in the device;

wherein triggering trusted platform module certification comprises:

causing an anonymous key system certificate to be requested by the anonymous key system service module from the combined anonymous key system and TPM firmware module;

interacting with the OS encryption module to generate a TPM key handle and to initiate finalization of a TPM certificate based on at least one of the TPM key handle and the anonymous key system certificate;

interacting with the combined anonymous key system and TPM firmware module to generate the TPM certificate based on at least the TPM key handle and to sign the TPM certificate using the anonymous key system certificate, thereby producing a signed TPM certificate;

receiving a request for TPM credentials from an attestation platform in the remote resource via the communication module;

causing the OS encryption module to obtain at least the TPM credentials and the TPM certificate from the combined anonymous key system and TPM firmware module; and cause the communication circuitry to transmit a response to the request, wherein the response comprises at least the TPM credentials for validation by the attestation platform;

wherein the anonymous key system is based on enhanced privacy identification (EPID) technology.

9. The method of claim 8, further comprising:
providing the signed TPM certificate to the interface module.

10. The method of claim 8, further comprising:
causing the communication module to transmit the signed TPM certificate to the certification platform; and
receiving a message from the certification platform via the communication module, the message at least indicating that signed TPM certificate is valid.

11. The method of claim 8, further comprising:
receiving a message from the attestation platform via the communication module, the message at least indicating at least that the TPM credentials have been validated.

12. The method of claim 11, wherein the response to the request further comprises the anonymous key system certificate or the TPM certificate for the attestation platform to use in validating the TPM credentials.

13. The method of claim 11, wherein the response to the request further comprises:
the anonymous key system certificate for the attestation platform to use in validating the trusted platform module certificate; and
the trusted platform module certificate for the attestation platform to use in validating the trusted platform module credentials.

14. At least one non-transitory machine-readable storage medium having stored thereon, individually or in combination, instructions for trusted platform module certification and attestation using an anonymous key system that, when executed by one or more hardware processors, cause the performance of the following operations comprising:

load a combined anonymous key system and trusted platform module (TPM) firmware module into a runtime environment in a device, the runtime environment further comprising at least an operating system (OS) encryption module, an anonymous key system service module, and an interface module to interact with at least a certification platform in a remote resource via communication circuitry of the device; and trigger at least one of trusted platform module certification or trusted platform module attestation in the device;

wherein triggering trusted platform module certification comprises:

causing an anonymous key system certificate to be requested by the anonymous key system service module from the combined anonymous key system and TPM firmware module;

interacting with the OS encryption module to generate a TPM key handle and to initiate finalization of a TPM certificate based on at least one of the TPM key handle and the anonymous key system certificate;

interacting with the combined anonymous key system and TPM firmware module to generate the TPM certificate based on at least the TPM key handle and to sign the TPM certificate using the anonymous key system certificate, thereby producing a signed TPM certificate;

receiving a request for TPM credentials from an attestation platform in the remote resource via the communication module;

causing the OS encryption module to obtain at least the TPM credentials and the TPM certificate from the combined anonymous key system and TPM firmware module; and cause the communication circuitry to transmit a response to the request, wherein the response comprises at least the TPM credentials for validation by the attestation platform; and wherein the anonymous key system is based on enhanced privacy identification (EPID) technology.

15. The non-transitory medium of claim 14, further comprising instructions that, when executed by one or more hardware processors, cause the performance of the following operations comprising:
provide the signed TPM certificate to the interface module.

16. The non-transitory medium of claim 14, further comprising instructions that, when executed by one or more hardware processors, cause the one or more hardware processors to perform the following operations comprising:
cause the communication module to transmit the signed TPM certificate to the certification platform; and
receive a message from the certification platform via the communication module, the message at least indicating that signed trusted platform module certificate is valid.

17. The non-transitory medium of claim 14, further comprising instructions that, when executed by one or more hardware processors, cause the performance of the following operations comprising:
receive a message from the attestation platform via the communication module, the message at least indicating at least that the TPM credentials have been validated.

18. The non-transitory medium of claim 17, wherein the response to the request further comprises the anonymous key system certificate or the TPM certificate for the attestation platform to use in validating the TPM credentials.

19. The non-transitory medium of claim 17, wherein the response to the request further comprises:
the anonymous key system certificate for the attestation platform to use in validating the TPM certificate; and the TPM certificate for the attestation platform to use in validating the TPM platform module credentials.

\* \* \* \* \*